(12) United States Patent
Anderson (10) Patent No.: US 7,516,658 B2
(45) Date of Patent: Apr. 14, 2009

(54) ELECTRO-KINETIC PRESSURE/FLOW SENSOR

(75) Inventor: William T. Anderson, Chanhassen, MN (US)

(73) Assignee: Rosemount Inc., Eden Prairie, MN (US)

( * ) Notice: Subject to any disclaimer, the term of this patent is extended or adjusted under 35 U.S.C. 154(b) by 263 days.

(21) Appl. No.: 11/541,469

(22) Filed: Sep. 29, 2006

(65) Prior Publication Data

US 2008/0083622 A1 Apr. 10, 2008

(51) Int. Cl.
*G01F 5/00* (2006.01)
(52) U.S. Cl. ...................................................... 73/202
(58) Field of Classification Search .................. 73/202, 73/114.34, 204.5, 204.21; 313/230
See application file for complete search history.

(56) References Cited

U.S. PATENT DOCUMENTS

| | | | | |
|---|---|---|---|---|
| 4,049,989 | A | * | 9/1977 | Bullis et al. .................. 313/230 |
| RE29,868 | E | * | 12/1978 | Schontzler et al. ........... 364/510 |
| 4,366,704 | A | * | 1/1983 | Sato et al. ................. 73/114.34 |
| 5,485,099 | A | | 1/1996 | Collins et al. ................ 324/439 |
| 6,537,799 | B2 | | 3/2003 | Chow et al. ............... 435/285.2 |
| 6,635,226 | B1 | | 10/2003 | Tso et al. ..................... 422/129 |
| 6,655,207 | B1 | | 12/2003 | Speldrich et al. ............ 73/202.5 |
| 6,886,401 | B2 | * | 5/2005 | Ito et al. ........................ 73/202 |
| 6,942,771 | B1 | | 9/2005 | Kayyen ....................... 204/409 |
| 7,395,700 | B2 | * | 7/2008 | Shimatsu ...................... 73/202 |
| 2003/0052007 | A1 | | 3/2003 | Paul et al. .................... 204/450 |
| 2004/0163957 | A1 | | 8/2004 | Neyer et al. ................. 204/450 |
| 2004/0167996 | A1 | | 8/2004 | Takamura et al. .............. 710/5 |
| 2004/0217279 | A1 | | 11/2004 | Hobbs et al. ................. 250/288 |
| 2004/0219072 | A1 | | 11/2004 | Yamakawa et al. .......... 422/100 |
| 2005/0034534 | A1 | | 2/2005 | Harnett et al. ............ 73/861.07 |

FOREIGN PATENT DOCUMENTS

SU 432 341 A1 6/1974

OTHER PUBLICATIONS

"Notification of Transmittal of the International Search Report and Written Opinion" from PCT/US2007/020970.

* cited by examiner

*Primary Examiner*—Jewel Thompson
(74) *Attorney, Agent, or Firm*—Westman, Champlin & Kelly, P.A.

(57) ABSTRACT

A transmitter senses flow or pressure of a process fluid in a process pipe. The process pipe may include a flow restrictor positioned therein that carries a primary flow of a process fluid. Impulse piping is configured to carry a secondary flow of the process fluid from an upstream side of the flow restrictor to a downstream side. An electro-kinetic element is positioned within the impulse piping and is configured to generate an electro-kinetic potential related to the primary flow. Measurement circuitry in the transmitter is configured to measure the electro-kinetic potential across the electro-kinetic element and relate the electro-kinetic potential to the flow of process fluid through the process pipe.

27 Claims, 6 Drawing Sheets

ELECTRO-KINETIC PRESSURE/FLOW SENSOR

BACKGROUND OF THE INVENTION

The present invention relates generally to industrial process transmitters. More particularly, the present invention relates to a flow meter or pressure sensor that couples to the industrial process transmitter.

Industrial process transmitters couple to industrial process equipment and/or conduits and are adapted to measure process variables such as pressure, mass flow rate, volume flow rate, temperature and the like. The process transmitter receives a signal from a sensor that indicates a value of the process variable and sends the signal corresponding to the value of the process variable to a control panel typically via a two-wire loop. Frequently, such transmitters draw power from a two-wire loop that carries an energy-limited loop current, which varies within a range of 4-20 mA.

There are many process flow sensors that are positioned within a main process line that create a pressure drop across the flow sensor. The differential pressure across the flow sensor is correlated to a flow rate. Examples of flow meters that correlate a pressure drop to a flow rate include an orifice plate and a venturi tube.

SUMMARY OF THE INVENTION

The present invention includes a transmitter for sensing flow of a process fluid. Process piping carries a primary flow of the process fluid and includes a flow restrictor to create a pressure drop. Impulse piping is configured to carry a secondary flow of the process fluid from an upstream side of the flow resistor to a downstream side. An electro-kinetic element is positioned within the impulse piping and configured to generate an electro-kinetic potential related to the primary flow. Measurement circuitry within the transmitter is configured to measure the electro-kinetic potential across the electro-kinetic element.

DETAILED DESCRIPTION

Figure 1:
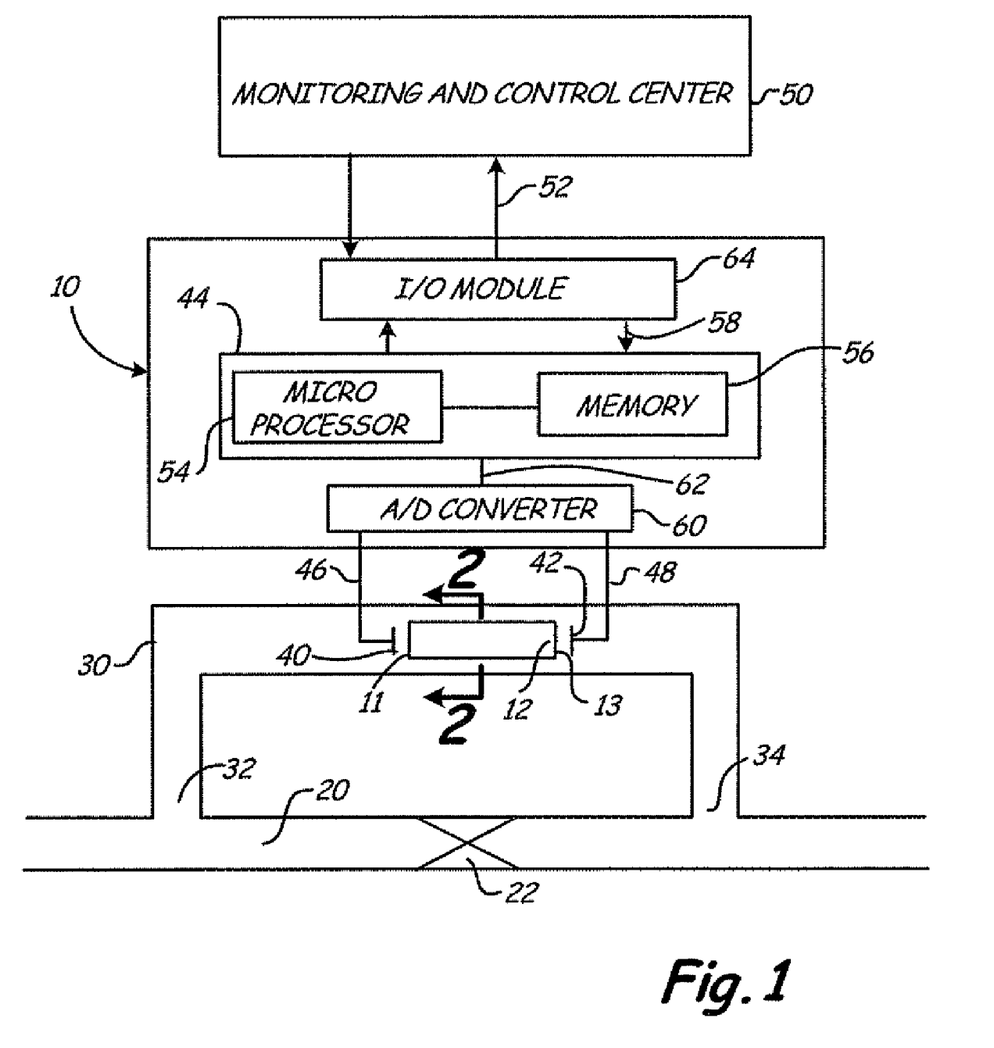
FIG. 1 is a schematic view of a process control transmitter of the present invention coupled to the electro-kinetic element.

A process control transmitter that is coupled to an electro-kinetic element to measure a flow rate or a pressure in an industrial process is generally illustrated in FIG. 1 at 10. As process fluid flows through an electro-kinetic element 12, the electro-kinetic element 12 develops an electro-kinetic potential. The process control transmitter 10, typically a two-wire process control transmitter, senses the electro-kinetic potential across the electro-kinetic element 12 and correlates the electro-kinetic potential to the flow rate of the process fluid in a main process pipe 20 or a pressure of the process fluid in the process pipe 20.

An electro-kinetic potential is the electric potential that is produced by forcing a fluid through a solid having micro-channels such as capillaries or pores. When fluid having ions moves through the micro-channels from an upstream end 11 to a downstream end 13 of the electro-kinetic element 12, the electro-static repulsion and attraction of the molecules along the interior surfaces of the micro-channels force ions of opposite charge to accumulate at one end of the micro-channel and forces ions of an opposite charge to accumulate at the other end of the micro-channel The micro-channels thereby effectively separate the fluid ions based upon the ions' charge.

As the charged ions of the fluid are separated and accumulated, they create two charged regions (one negative and one positive) in the fluid proximate the upstream and downstream ends 11, 13 of the electro-kinetic element 12. A set of electrodes 40, 42 are immersed in the charged regions and effectively determine the resulting electro-potential between the two charged regions. A current can be obtained that correlates to the determined electro-potential.

The value of the electro-potential can be correlated to the flow rate of the fluid moving through the electro-kinetic element 12. The flow rate of the fluid is in turn correlated to the differential pressure of the fluid which then correlates to a flow rate of process fluid in the main process pipe 20 or the pressure of the process fluid in the main process pipe 20.

The area, thickness and other physical characteristics of the electro-kinetic element 12 are factors in determining the magnitude of the measured electro-kinetic potential. For example, if the electro-kinetic element 12 has a small cross-sectional area in a direction perpendicular to the direction of fluid flow, then the charged regions at the ends 11, 13 of the electro-kinetic element 12 will also be small, resulting in fewer charged ions and a relatively smaller electric potential.

Similarly, the materials used to construct the electro-kinetic element 12 may also impact the magnitude of the measured electro-kinetic potential across the electro-kinetic element 12. Besides having micro-channels, the electro-kinetic element should also be non-conductive. A typical material of construction of the electro-kinetic element 12 includes silicon oxide and micro-porous glass. However, other materials of construction are within the scope of the present invention.

The electro-kinetic element 12 is shown positioned within impulse piping 30 connected to the main process pipe 20 and around a flow restrictor 22. The impulse piping 30 has an inlet 32 at an upstream side 24 of the flow restrictor 22 and an outlet 34 at the downstream side 26 of the flow restrictor 22. The pressure drop created by the flow restrictor 22 forces a secondary flow of the process fluid through the impulse piping 30 and the electro-kinetic element 12.

In one configuration, the flow restrictor 22 comprises a valve which can be manipulated to increase or decrease the flow rate of the process fluid within the main process pipe 20 depending upon the electro-kinetic potential created across the electro-kinetic element 12. However, static or non-moving in-line flow restrictors may be connected to the pipe to restrict flow of the process fluid including, but not limited to, an orifice plate, a weir and a pipe segment having a diameter that is smaller than a diameter of the main process pipe 20.

Process fluids can be of the type of liquid or gaseous fluid that contains ions such as water and steam. The ions in the process fluid can include positively charged cations and negatively charged anions and the process fluid can be either acidic, neutral or basic.

The cations in the process fluid accumulate in the charged region proximate the upstream end 11 of the electro-kinetic element 12 and the anions in the process fluid accumulate in the charged region proximate the downstream end 13 of the electro-kinetic element 12 to create the electro-kinetic potential. However, a configuration of the electro-kinetic element 12 may be reversed in the impulse piping 30 such that the anions accumulate in the charged region proximate the upstream end 11 and the cations accumulate in the charged region proximate the downstream end 13 of the electro-kinetic element 12 to create the same electro-kinetic potential.

The electro-kinetic potential is measured by positioning a first electrode 40 within the impulse piping 30 in the charged region proximate the upstream end 11 of the electro-kinetic element 12 and a second electrode 42 positioned in the charged region within the impulse piping 30 proximate downstream end 13 of the electro-kinetic element 12. An analog-to-digital (A/D) converter 60 within the transmitter 10 is coupled to the first and second electrodes 40, 42, with wires 46, 48, respectively. The A/D converter 60 converts the analog electro-kinetic potential measurement into a digital signal and transmits the digital signal to measurement circuitry 44 via a wire 62.

The measurement circuitry 44 includes a microprocessor 50 and memory 52 that measures the electro-kinetic potential across the electro-kinetic element 12 and correlates the measured electro-kinetic potential to either the flow rate or the pressure of the process fluid in the process pipe 20. Once the measurement circuitry 44 determines the value of the process variable, such as the flow rate or pressure of the process fluid in the process pipe 20, the transmitter 10 transmits a signal via wires 59 to an input/output (I/O) module 64 within the transmitter 10.

In this example, the I/O module 64 transmits the signal to a process monitoring and control center 50 typically by a two-wire process control loop 52. The process monitoring and control center 50 can be, for example, a control room with one or more computer systems coupled to the network and adapted to communicate with one or more field devices and/or transmitters that are coupled to an industrial process.

The transmitter 10 uses the two-wire process control loop 52 for signal transmission and power from the process monitoring and control center 50. For example, two-wire process control loops 52 may utilize 4-mA signaling techniques and digital communication techniques such as HART®, Fieldbus, Profibus, and other communication protocols such as wireless communication protocols.

The transmitter circuitry 44 can measure the electro-kinetic potential across the electro-kinetic element 12 in either volts or amperes. The flow of the process fluid through the electro-kinetic element 12 may generate a sufficient amount of electricity to power the measurement circuitry 44 of the process transmitter 10.

Figure 2:
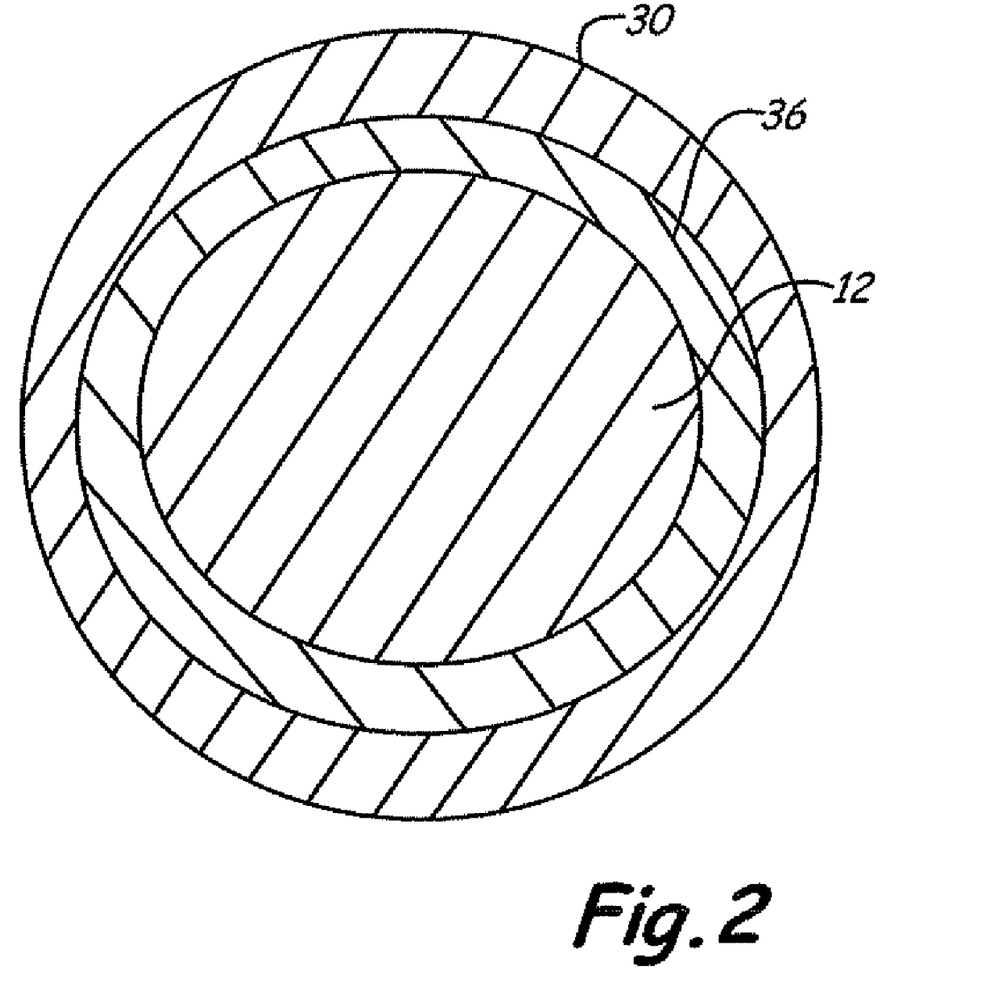
FIG. 2 is a cross-section view of the electro-kinetic element along section lines 2-2 in FIG. 1.

FIG. 2 shows one configuration of impulse piping 30. An inner surface of the impulse piping 30 can be coated with a non-conductive material 36 such as a non-conductive ceramic or plastic material. The non-conductive material 36 allows the first and second electrodes 40, 42 to accurately measure the electro-kinetic potential created across the electro-kinetic element 12 without interference from the metallic impulse piping 30.

Figure 3:
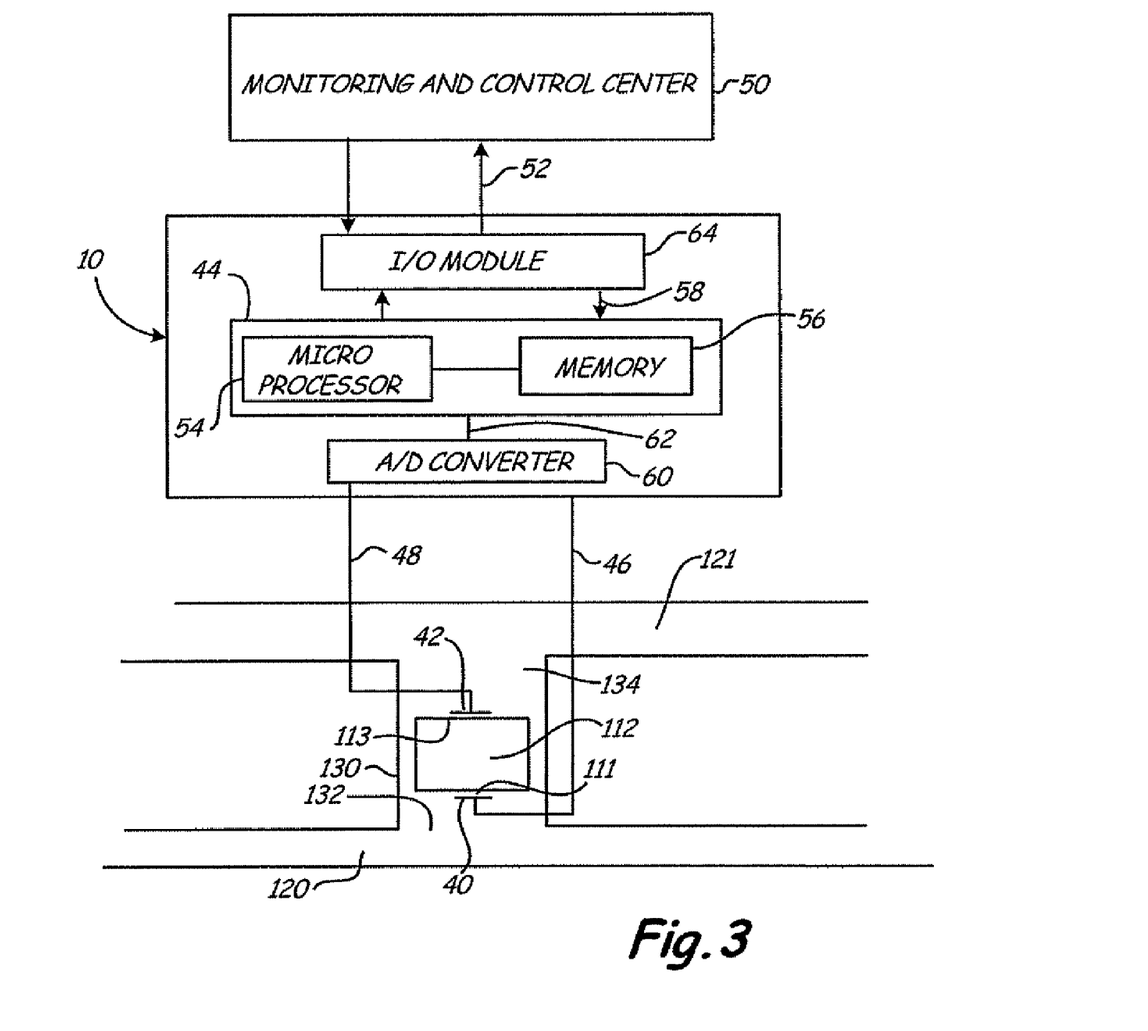
FIG. 3 is another schematic view of a process control transmitter of the present invention coupled to the electro-kinetic element.

Another process control transmitter that is coupled to an electro-kinetic element to measure a flow rate or a pressure in an industrial process pipe is generally illustrated in FIG. 3 at 100. Like components of the process control transmitters 10 and 100 will be given like reference characters throughout this application.

Similar to the process control transmitter 10, the process control transmitter 100 includes a process fluid that flows through an electro-kinetic element 112 and develops an electro-kinetic potential. The process control transmitter 100 senses the electro-kinetic potential across the electro-kinetic element 112 and correlates the electro-kinetic potential to the flow rate of the process fluid in a main process pipe 120 or a pressure of the process fluid in the process pipe 120.

The electro-kinetic element 112 is shown positioned within impulse piping 130 connected the main process pipe 120 and a receptacle 121. The receptacle 121 is typically another process pipe at a lower pressure than the main process pipe 120 or a drain. Because the receptacle 121 is at a lower pressure than the main process pipe 120, a secondary flow of the process fluid flows through an inlet 132 of the impulse piping 130, through the electro-kinetic element 112 and into the receptacle 121 through an outlet 134 in the process piping 130.

The electro-kinetic element 112 contains numerous microchannels, such as capillaries or pores, through which the process fluid flows. The cations in the process fluid accumulate in a charged region proximate an upstream end 111 of the electro-kinetic element 112 and the anions in the process fluid accumulate in a charged region proximate a downstream end 113 of the electro-kinetic element 12 to create the electro-kinetic potential. However, a configuration of the electro-kinetic element 112 may be reversed in the impulse piping 130 such that the anions accumulate in the charged region proximate the upstream end 11 and the cations accumulate in a charged region proximate the downstream end 113 of the electro-kinetic element 112 to create the same electro-kinetic potential.

A value of the electro-kinetic potential can be correlated to the flow rate of the process fluid through the electro-kinetic element 112. The flow rate of the process fluid through the process pipe 120, or the pressure of the process fluid in the process pipe 120, is calculated by correlating the sensed electro-kinetic potential across the electro-kinetic element 112 as described with respect to the transmitter 10.

Figure 4:
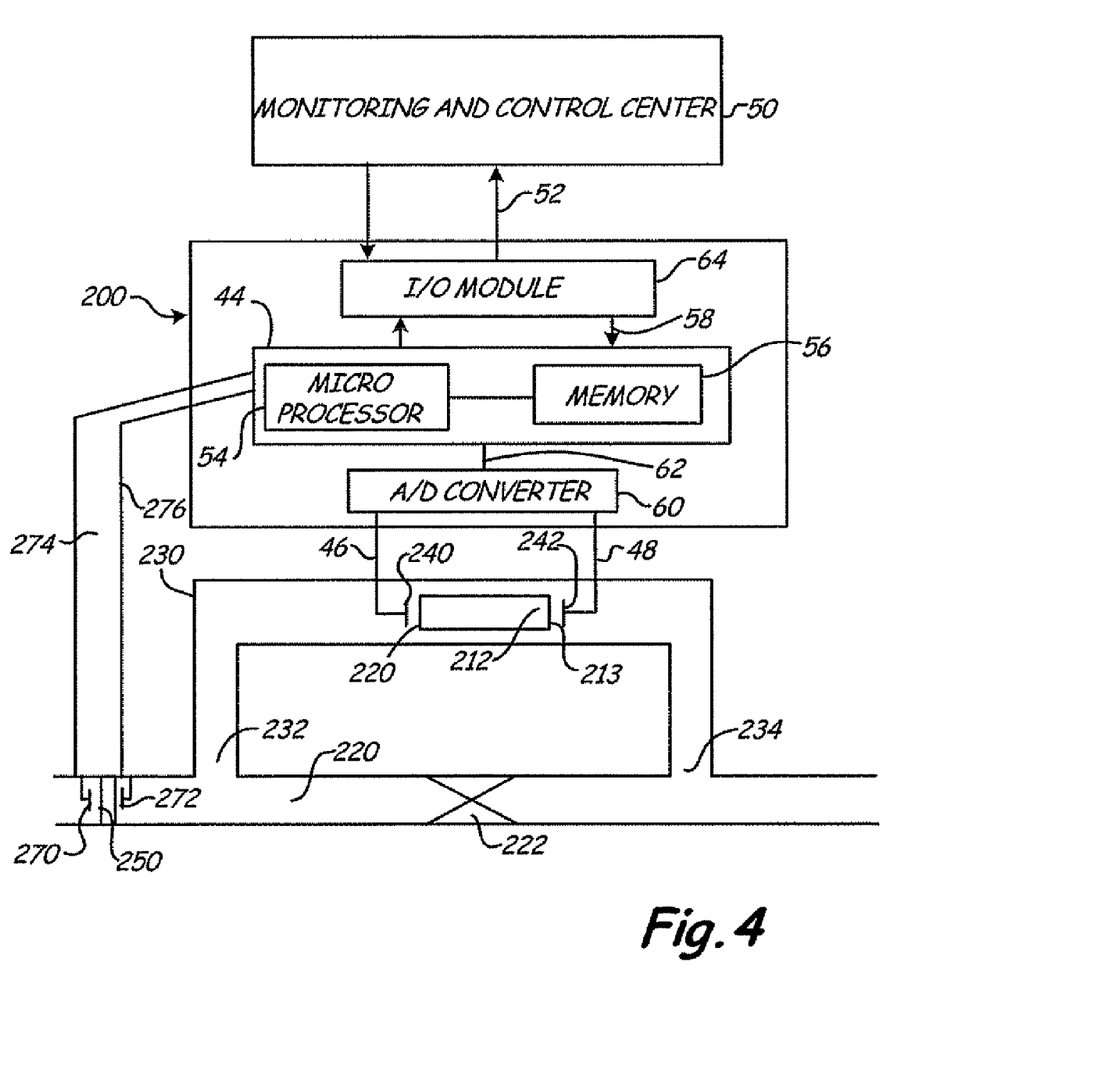
FIG. 4 is another schematic view of a process control transmitter of the present invention coupled to the electro-kinetic element.

Another process control transmitter is coupled to an electro-kinetic element to measure a flow rate of pressure in industrial process is generally illustrated in FIG. 4 at 200. Similar to the process control transmitters 10 and 100, the process transmitter 200 includes process fluid that flows through a measurement electro-kinetic element 212 and develops an electro-kinetic potential. The process control transmitter 200 senses the electro-kinetic potential across the measurement electro-kinetic element 212 and correlates the electro-kinetic potential to the flow rate of the process fluid in the main process pipe 220 or a pressure of the process fluid in the main process pipe 220, as previously describe with respect to transmitters 10 and 100, with electrodes 240, 242 positioned proximate ends 211, 213 of the electro-kinetic element 212.

The electro-kinetic element 212 is shown positioned with impulse piping 230 positioned around a flow restrictor 222. The impulse piping 230 includes an upstream inlet 232 and a downstream outlet 234 such that the flow restrictor 222 causes a differential pressure drop which allows process fluid to flow through the impulse piping 230. However, the configuration as shown in FIG. 3 is also typical.

The transmitter 200 is powered by a power generating electro-kinetic instrument 250 that is positioned within the main process pipe 220 typically upstream of the electro-kinetic element 212. However, the power generating electro-kinetic instrument 250 may also be positioned downstream of the measurement electro-kinetic element 212 or within the flow restrictor 222.

Figure 5:
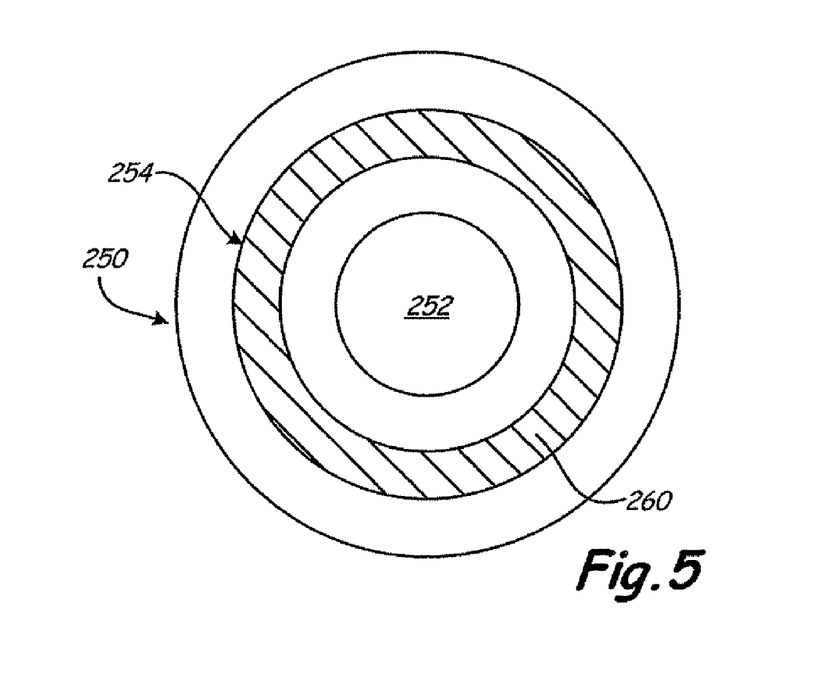
FIG. 5 is a front view of an orifice plate having a power generating electro-kinetic element contained therein.
Figure 6:
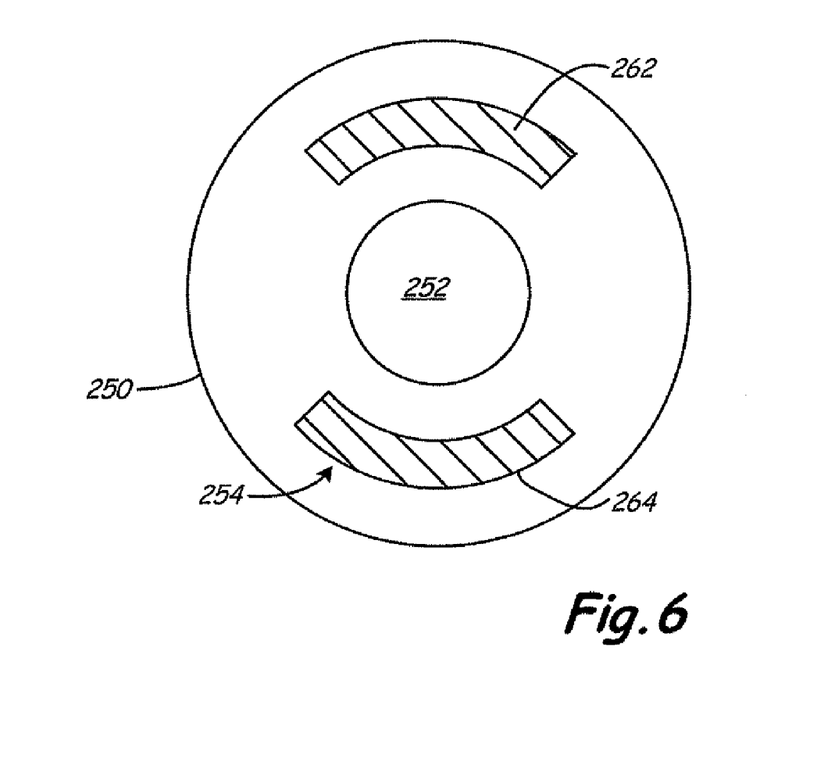
FIG. 6 is a front view of another orifice plate having a power generating electro-kinetic element contained therein.
Figure 7:
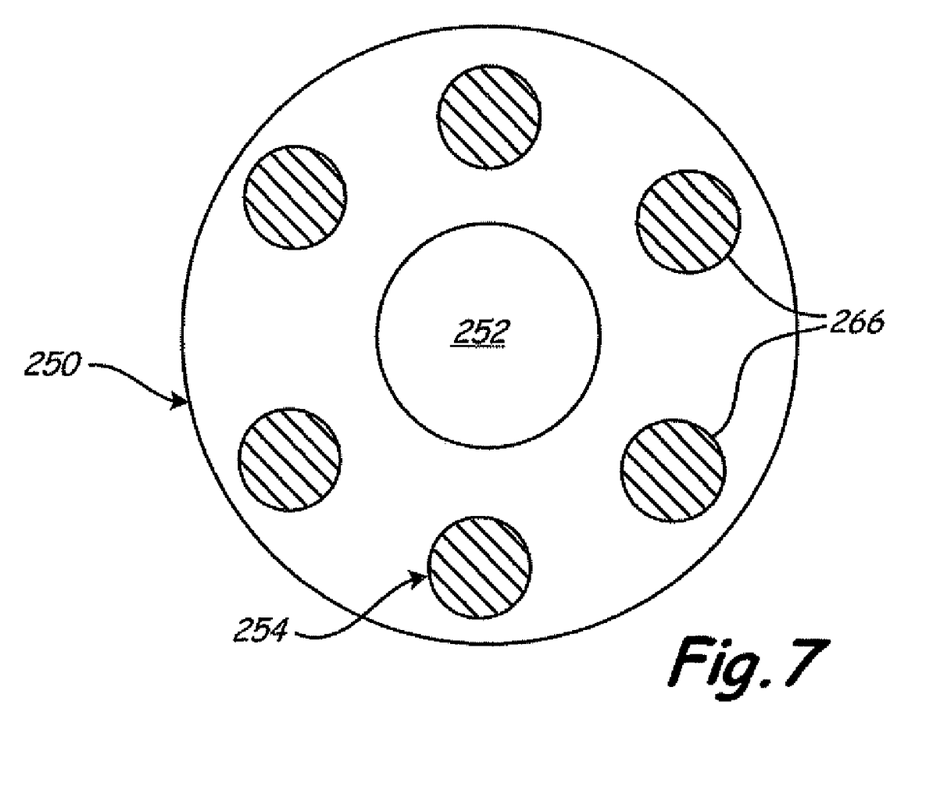
FIG. 7 is a front view of another orifice plate having a power generating electro-kinetic element contained therein.

Referring to FIGS. 5-7, the power generating electro-kinetic instrument 250 typically is an orifice plate with a central opening 252 for allowing process fluid to flow therethrough and one or more power generating electro-kinetic elements 254 embedded within the orifice plate 250. The power generating electro-kinetic element 254 can take one of numerous configurations including, but not limited to, an annular ring 260 as illustrated in FIG. 5; arcuate portions 262, 264 as illustrated in FIG. 6 or a plurality of discs 266 as illustrated in FIG. 7.

The power generating electro-kinetic elements 254 are positioned within the orifice plate 250 to generate an electro-kinetic potential and current as described previously. The current and electro-kinetic potential is measured by upstream and downstream electrodes 270, 272 which are connected to the measurement circuitry 44 with wires 274, 276 to supply the power necessary for the measurement circuitry to function.

The power generating electro-kinetic instrument 250 is typically not utilized to measure process variables, but rather to generate sufficient electric potential and current to power the measurement circuitry 44 of the transmitter 200. In certain locations, such as in remote locations where signals are wirelessly transmitted to the control room, an independent power source, such as the electro-kinetic instrument 250, may be useful in providing power to the measurement circuitry 44.

Although the present invention has been described with reference to preferred embodiments, workers skilled in the art will recognize that changes may be made in form and detail without departing from the spirit and scope of the invention.

What is claimed is:

1. A transmitter for sensing flow or pressure of a process fluid comprising:
  a process pipe configured to carry a primary flow of a process fluid;
  a flow restrictor in the pipe;
  impulse piping configured to carry a secondary flow of the process fluid from an upstream side of the flow restrictor to a downstream side;
  an electro-kinetic element positioned within the impulse piping having an electro-kinetic potential related to the primary flow;
  measurement circuitry configured to measure the electro-kinetic potential across the electro-kinetic element that generates a signal related to the flow or the pressure of the process fluid;
  wherein the electro-kinetic element comprises a plurality of micro-channels and wherein flow of the process fluid though the micro-channels generates the electro-kinetic potential across the electro-kinetic element and wherein the electro-kinetic potential across the electro-kinetic element is related to the flow though the plurality of micro-channels.

2. The transmitter of claim 1 and further comprising:
  a first electrode proximate an upstream end of the electro-kinetic element;
  a second electrode proximate a downstream end of the electro-kinetic element and wherein the measurement circuitry couples to the first and second electrodes to measure the voltage generated across the electro-kinetic element.

3. The transmitter of claim 1, wherein the electro-kinetic potential generated by the electro-kinetic element provides sufficient electricity to power the measurement circuitry of the transmitter.

4. The transmitter of claim 1, wherein an interior surface of the impulse piping comprises a non-conductive liner.

5. The transmitter of claim 4, wherein the non-conductive liner comprises a ceramic material or a plastic material.

6. The transmitter of claim 1, wherein the process fluid comprises ions.

7. The transmitter of claim 1, wherein the flow restrictor comprises a valve.

8. The transmitter of claim 1, wherein the measurement circuitry transmits the signal to a monitoring and control center.

9. A method of measuring a flow rate or a pressure of a process fluid in a main process pipe carrying a primary flow of the process fluid, the method comprising:
  providing a flow restrictor within the main process pipe to create a pressure drop;
  securing impulse piping to the process pipe and wherein an inlet to the impulse piping is upstream of the flow restrictor and an outlet of the impulse piping is downstream of the of the flow restrictor and wherein the impulse piping carries a secondary flow of the process fluid;
  generating an electro-kinetic potential with an electro-kinetic element positioned within the impulse piping by flowing the secondary flow of the process fluid through the electro-kinetic element;
  determining the flow rate through the main process pipe or the pressure of the process fluid in the main process pipe by measuring the electro-kinetic potential across the electro-kinetic element with measurement circuitry of a process control transmitter by relating the electro-kinetic potential to the flow rate in the main process pipe or the pressure of the process fluid in the main process pipe; and
  wherein the electro-kinetic element comprises a plurality of micro-channels and wherein flow of the process fluid through the micro-channels generates the electro-kinetic potential across the electro-kinetic element and wherein the electro-kinetic potential across the electro-kinetic element is related to the flow through the plurality of micro-channels.

10. The method of claim 9 and further comprising:
  positioning a first electrode within the impulse piping proximate an upstream end of the electro-kinetic element; and
  positioning a second electrode within the impulse piping proximate a downstream end of the electro-kinetic element and wherein the first and second electrodes couple to the measurement circuitry of the transmitter to measure the electro-kinetic potential across the electro-kinetic element.

11. The method of claim 9 and further comprising converting the electro-kinetic potential across the electro-kinetic element to a digital signal with an analog to digital converter and transmitting the digital signal to the measurement circuitry.

12. The method of claim 11 and further comprising processing the digital signal through a microprocessor and memory of the measurement circuitry.

13. The method of claim 12 and further comprising transmitting the signal from the measurement circuitry to an input/output module and wherein the input/output module transmits and receives signals to and from a monitoring and control center via a two wire control loop.

14. The method of claim 9 and further comprising coating an interior surface of the impulse piping with a non-conductive material.

15. A transmitter for sensing pressure or flow rate of a process fluid comprising:
   a process pipe configured to carry a primary flow of a process fluid;
   a receptacle having a lower pressure than a pressure in the process pipe
   impulse piping configured to carry a secondary flow of the process fluid from the process pipe to the receptacle;
   an electro-kinetic element positioned within the impulse piping having an electro-kinetic potential related to the primary flow;
   measurement circuitry configured to measure the electro-kinetic potential across the electro- kinetic element that generates a signal related to the pressure or the flow rate of the process fluid; and
   wherein the electro-kinetic element comprises a plurality of micro-channels and wherein flow of the process fluid though the micro-channels generates the electro-kinetic potential across the electro-kinetic element and wherein the electro-kinetic potential across the electro-kinetic element is related to the flow though the plurality of micro-channels.

16. The transmitter of claim 15 and further comprising:
   a first electrode proximate an upstream end of the electro-kinetic element;
   a second electrode proximate a downstream end of the electro-kinetic element and wherein the measurement circuitry couples to the first and second electrodes to measure the voltage generated across the electro-kinetic element.

17. The transmitter of claim 16, wherein the electro-kinetic potential generated by the electro-kinetic element provides sufficient electricity to power the measurement circuitry of the transmitter.

18. The transmitter of claim 15, wherein an interior surface of the impulse piping comprises a non-conductive liner.

19. The transmitter of claim 18, wherein the non-conductive liner comprises a ceramic material or a plastic material.

20. The transmitter of claim 15, wherein the process fluid comprises ions.

21. The transmitter of claim 15, wherein the receptacle comprises a receiving pipe having a lower pressure than the process pipe.

22. The transmitter of claim 15, wherein the receptacle comprises a drain.

23. A transmitter for sensing flow or pressure of a process fluid comprising:
   a process pipe configured to carry a primary flow of a process fluid;
   a power generating electro-kinetic instrument positioned within the process pipe;
   a flow restrictor in the pipe;
   impulse piping configured to cany a secondary flow of the process fluid from an upstream side of the flow restrictor to a downstream side;
   a measurement electro-kinetic element positioned within the impulse piping having an electro-kinetic potential related to the primary flow; and
   measurement circuitry configured to measure the electro-kinetic potential across the electro-kinetic element that generates a signal related to the flow or the pressure of the process fluid, and wherein power is supplied to the measurement circuitry by the power generating electro-kinetic instrument.

24. The transmitter of claim 23 and wherein the power generating electro-kinetic instrument is positioned within an orifice plate.

25. The transmitter of claim 23 and wherein the power generating electro-kinetic instrument is positioned within the process pipe upstream of the measurement electro-kinetic element.

26. The transmitter of claim 23 and wherein the power generating electro-kinetic instrument is positioned within the process pipe downstream of the measurement electro-kinetic element.

27. The transmitter of claim 23 and further comprising first and second electrodes positioned proximate opposite ends of the power generating electro-kinetic instrument and wherein the first and second electrodes are connected to the measurement circuitry to provide power thereto.

* * * * *